July 17, 1928.

A. E. BRONSON 1,677,616

STEERING WHEEL

Filed Jan. 14, 1925

2 Sheets-Sheet 1

July 17, 1928.

A. E. BRONSON

STEERING WHEEL

Filed Jan. 14, 1925

1,677,616

2 Sheets-Sheet 2

Inventor
Adelbert E. Bronson
Thurston Kwis & Hudson
attys.

Patented July 17, 1928.

1,677,616

UNITED STATES PATENT OFFICE.

ADELBERT E. BRONSON, OF CLEVELAND, OHIO, ASSIGNOR TO THE DILL MANUFACTURING COMPANY, OF CLEVELAND, OHIO, A CORPORATION OF OHIO.

STEERING WHEEL.

Application filed January 14, 1925. Serial No. 2,248.

The present invention relates to a steering wheel more particularly intended for automobiles.

The object of the invention is to provide a steering wheel which may be moved from its position when in steering engagement with the steering post to a vertical position behind the steering post, thereby affording room for the driver to get out of the seat of the vehicle.

A further object is to provide a tilting steering wheel which not only tilts backward but drops down behind the steering post so as to be at least in part below the wind shield of the automobile.

A further object is to provide a steering wheel which when in back of the steering post will be in position such that it will engage the control segments customarily used on certain types of cars, as Ford cars, thereby preventing the spinning of the steering wheel when in its tilted position.

Figure 1:
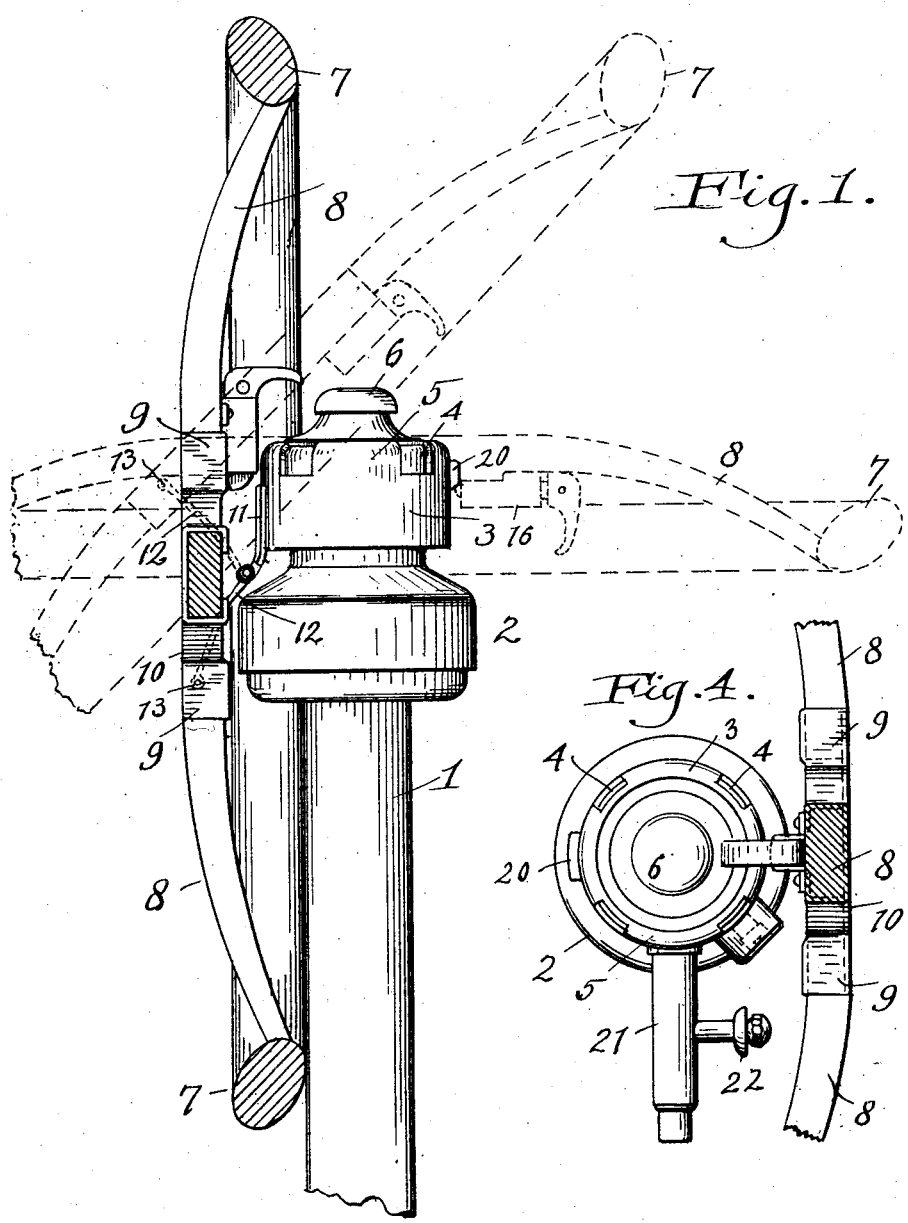
Figure 2:
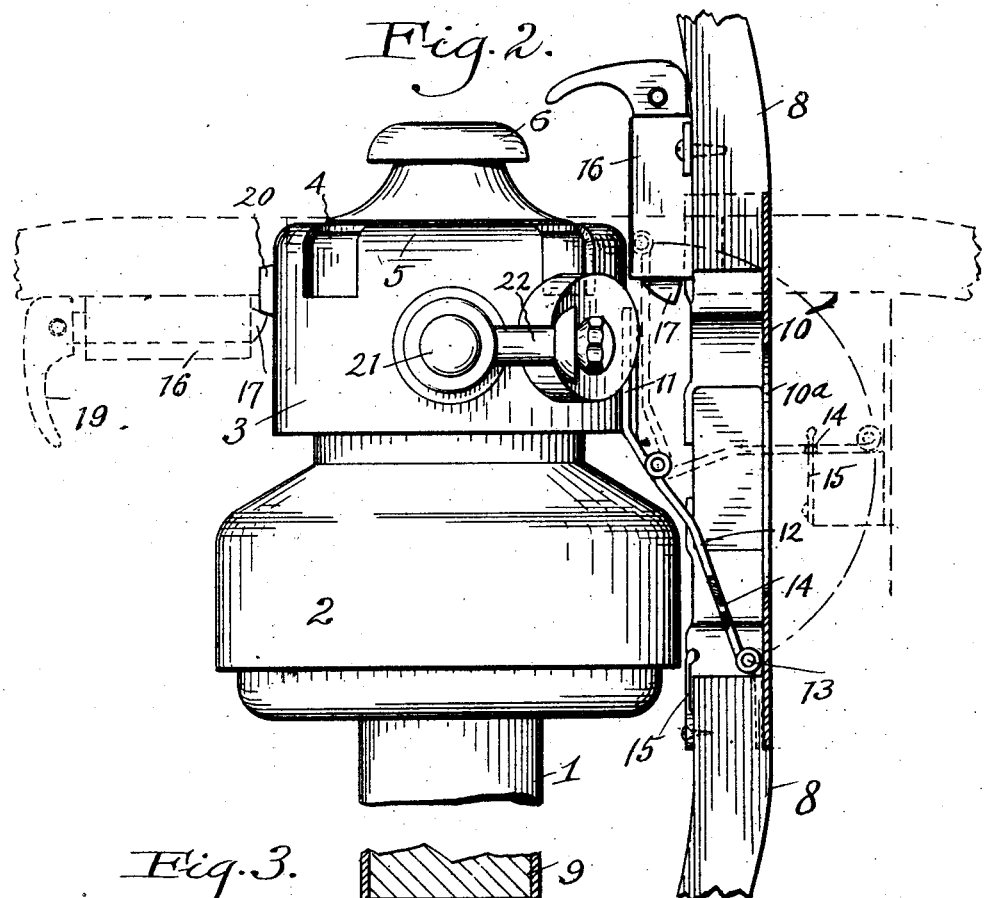
Figure 3:
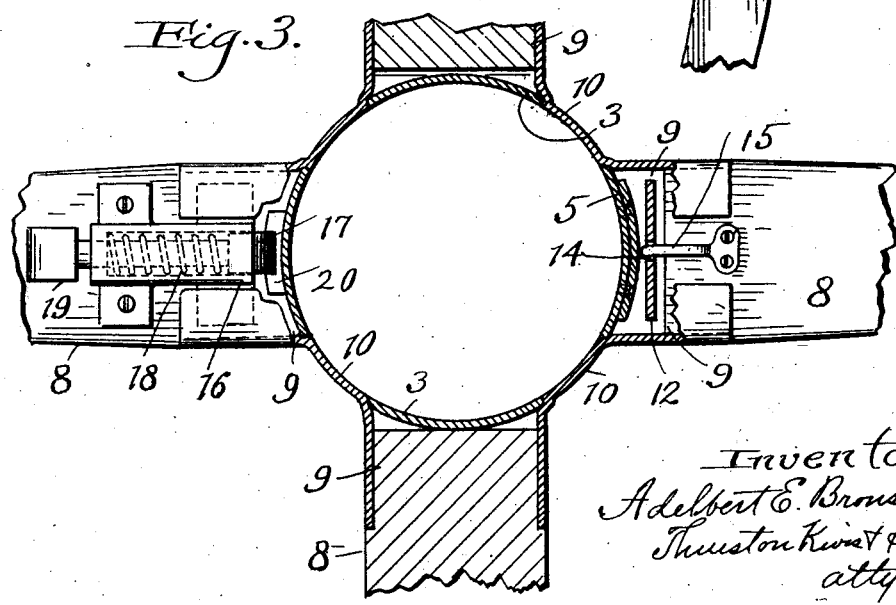

Reference should be had to the accompanying drawings forming a part of this specification, in which Fig. 1 is an elevation with portions in section of a steering wheel mounted upon a steering post; Fig. 2 is an elevation with portions in section of the steering wheel; Fig. 3 is a bottom plan view with portions in section of a part of the steering wheel; Fig. 4 is an elevation with portions in section showing a part of the steering wheel and its mounting.

The invention as it is shown is applied to the steering post of a Ford automobile, but it will be understood that the invention is not limited in this particular.

The steering post of the automobile is indicated at 1, and at 2 is indicated a casing which houses gearing used in the steering mechanism of Ford automobiles.

At the upper portion of the casing 2 there is a cap 3 which may be made of pressed metal, which cap is cylindrical in form, and is adapted to fit over a cylindrical portion at the top of the steering post. This cap is provided with cut out portions, as indicated at 4, which form intermediate spaced parts which are indicated at 5. The cap member 3 as before stated, is mounted upon a cylindrical part at the top of the steering wheel, and has a driving fit or is otherwise secured upon the steering post so that it can not be removed.

The cap member 3 is provided with a central opening through which projects a horn button, as indicated at 6. The steering wheel proper comprises a rim member 7 with a plurality of arms 8. These arms at their inner ends are secured in sockets 9 of a spider member 10, which spider member has a cylindrical central portion which is adapted to engage with the outer surface of the cap member 3. The portion of the spider member 10 at the portions which form the sockets 9 is adapted to fit over the parts 5 which lie between the intermediate depressions 4. This construction provides an interlocking engagement between the cap member 3 and the spider 10 when the two are in engagement, so that when force is applied to the rim of the steering wheel for the purpose of turning it this movement is communicated to the cap member 3, which in turn communicates the movement to the steering post.

Secured to the cap member 3 is a leaf 11 of a double hinge member, a second leaf of the hinge member being designated at 12. When the steering wheel is in engagement with the cap member 3 the leaf 12 folds against the leaf 11 of the spring, and when the steering wheel proper is tilted the leaf member 12 may turn about its pivotal connection with the leaf 11. It should be also noted that the leaf 12 has a pivotal connection with one of the arms of the steering wheel, as indicated at 13. This double hinge arrangement not only permits the steering wheel to be tilted, but also permits it to drop down behind the steering post when it is in tilted position, as clearly indicated in Fig. 2.

By virtue of this construction, the steering wheel drops behind the steering post and is below the windshield of the automobile. In this position the wheel will be in position to engage with the segment upon which the control levers for a Ford automobile are mounted, and because of this engagement the wheel can not be turned when in tilted position except for a limited amount. In other words, the steering wheel can not make a complete turning movement around the steering post.

The leaf member 11 is provided with a hole or opening 14 which is in position to be engaged by a pin 15 which pin is mounted upon an arm of the steering wheel, so that when the leaf 12 of the hinge is folded the pin 15 will enter the hole 14 and so provide a stop member as well as a positioning member to hold the leaf 12 with respect to the arm of the steering wheel.

One of the arms 8 is provided with a latch mechanism which comprises a casing 16 in which is mounted a latch member 17 which is spring pressed by means of a spring 18. The latch member 17 has a depending finger engaging member 19 by which the latch 17 may be retracted.

Upon an appropriate portion of the cup-shaped member 3 there is an extension 20 beneath which the latch member 17 is adapted to engage when the steering wheel is in steering position, or in other words, when the spider 10 is in engagement with the cup-shaped member 3. This arrangement obviously prevents the tilting of the steering wheel except at the time when the latch member 17 is withdrawn.

As before stated, the cup-shaped member 10 has a central opening 10ª which is shown in Fig. 2, which passes over the horn button 6 when the steering wheel is moved into its steering position. It should also be noted that by the provision of the double hinge, the steering wheel may be moved to tilting position without engaging with the horn button, which would be quite difficult except for the double hinge construction which has been described.

In the particular wheel which is described the cup-shaped member 3 covers a portion which is secured to the steering wheel by means of a bolt 21, the bolt being operated by means of a member 22. When the bolt member 21 is withdrawn it disconnects the cup-shaped member 3, and the part with which it directly engages from the steering column, thus permitting the steering wheel to be disengaged, and where desired appropriate lock controlled mechanism may be provided, thereby serving to permit the steering wheel to be disengaged from driving relationship with the steering post when it is desired to lock the steering wheel against movement and use of the car by unauthorized persons. This, however, forms no part of the present invention, and is merely incidentally mentioned.

The cup-shaped member 3 as well as the spider 10 may be formed of pressed metal, so that the construction provided is light and may be manufactured at low cost, at the same time providing a tilting wheel with all the desired qualifications of such a wheel.

Having described my invention, I claim:—

1. A steering wheel construction comprising a member which is adapted to be secured to a steering post, as steering wheel having a rim and spokes, a member to which the inner ends of the spokes are connected, said member being adapted to fit over a portion of the first mentioned member, a hinge member having a portion thereof secured to the first mentioned member, and another portion thereof pivotally connected with the steering wheel, said hinge members folding into engagement with each other when the steering wheel is in operative steering position.

2. A steering wheel construction comprising a member adapted to be secured to a steering post said member being provided with a plurality of radially extending arms, a steering wheel comprising a rim and spokes, a member connecting the inner ends of the spokes, said member being adapted to engage with the first mentioned member, said second member having inwardly extending parts formed to engage with the said radially extending arms to form a locking connection with the first mentioned member, and a hinge having a link thereof secured to the first mentioned member and having another link thereof pivotally connected with the steering wheel.

3. In a steering wheel construction comprising a member adapted to be secured to a steering post, a steering wheel having a rim and spokes, a member connecting the inner ends of the spokes, said member having a central opening adapted to fit over said first member, the first mentioned member and the second mentioned member having interengaging portions forming a locking connection between the two when the same are in engagement, a hinge having a link portion mounted upon the first mentioned member, said hinge having another link portion which is pivotally connected with the steering wheel.

4. A steering wheel construction comprising a member adapted to be mounted upon a steering post, a steering wheel having a rim and arms, a member connecting the inner ends of the arms, a hinge having a part thereof secured to the first mentioned member, having a second part thereof pivotally connected with the steering wheel, the second mentioned part of the hinge being provided with an opening adjacent its pivotal connection with the steering wheel, a projecting member carried by the steering wheel adjacent the pivotal connection of the hinge therewith said projecting member adapted to enter the said hole when the steering wheel is moved into engaging position for steering.

5. A steering wheel construction comprising a member adapted to be mounted upon a steering post, said member being provided with radially extending arms, a steering wheel having a rim and spokes, a member connecting the inner ends of the spokes, said member having inwardly extending portions formed to engage with the arms on the first mentioned member when the two are brought into engagement and the steering wheel is in steering position thereby forming a locking connection between the first and second members, a hinge having a link portion thereof secured to the first mentioned member, said hinge having another link portion which is pivotally connected with the steering wheel whereby the same may be tilted and dropped behind a steering post, a latch member carried by the steering wheel, and means on the first mentioned member co-operative with the latch to hold the steering wheel in steering position.

In testimony whereof, I hereunto affix my signature.

ADELBERT E. BRONSON.